United States Patent
Cummings et al.

(10) Patent No.: US 7,151,468 B2
(45) Date of Patent: Dec. 19, 2006

(54) STOP ALERT WARNING SYSTEM

(76) Inventors: Richard Cummings, 625 Marshall Rd., Coldwater, MI (US) 49036; Aaron Cummings, 515 W. Colon Rd., Coldwater, MI (US) 49036

(*) Notice: Subject to any disclaimer, the term of this patent is extended or adjusted under 35 U.S.C. 154(b) by 58 days.

(21) Appl. No.: 10/958,110

(22) Filed: Oct. 4, 2004

(65) Prior Publication Data

US 2006/0071814 A1 Apr. 6, 2006

(51) Int. Cl.
- B60Q 1/00 (2006.01)
- G08G 1/01 (2006.01)
- G08G 1/09 (2006.01)
- G08G 1/095 (2006.01)
- G08G 1/14 (2006.01)
- G08G 1/16 (2006.01)

(52) U.S. Cl. .................. 340/903; 340/905; 340/907; 340/932.2; 340/933; 340/936; 340/435; 340/436

(58) Field of Classification Search ............ 340/903, 340/905, 907, 933, 936, 435, 436, 932.2
See application file for complete search history.

(56) References Cited

U.S. PATENT DOCUMENTS

| | | | |
|---|---|---|---|
| 4,775,865 A | 10/1988 | Smith et al. | |
| 5,617,086 A * | 4/1997 | Klashinsky et al. | 340/907 |
| 5,892,461 A * | 4/1999 | Dokko | 340/907 |
| 5,917,430 A | 6/1999 | Greneker, III et al. | |
| 5,940,010 A * | 8/1999 | Sasaki et al. | 340/901 |
| 5,977,884 A | 11/1999 | Ross | |
| 6,046,686 A | 4/2000 | Mitchell et al. | |
| 6,064,318 A | 5/2000 | Kirchner, III et al. | |
| 6,150,932 A * | 11/2000 | Kenue | 340/435 |
| 6,163,277 A | 12/2000 | Gehlot | |
| 6,166,658 A | 12/2000 | Testa | |
| 6,204,778 B1 | 3/2001 | Bergan et al. | |
| 6,323,785 B1 * | 11/2001 | Nickell et al. | 340/933 |
| 6,326,887 B1 * | 12/2001 | Winner et al. | 340/435 |
| 6,384,740 B1 | 5/2002 | Al-Ahmed | |
| 6,580,374 B1 * | 6/2003 | Schrage | 340/933 |
| 6,606,033 B1 * | 8/2003 | Crocker et al. | 340/901 |
| 6,720,889 B1 | 4/2004 | Yamaki | |

* cited by examiner

*Primary Examiner*—Daniel Wu
*Assistant Examiner*—Lam Pham
(74) *Attorney, Agent, or Firm*—George L. Boller

(57) ABSTRACT

An on-site roadway warning system for alerting a driver of an approaching vehicle of a need to brake the vehicle. A transceiver radiates electromagnetic energy toward the approaching vehicle and receives reflected energy from the vehicle. A processor processes data about the reflected energy in relation to data about the radiated energy to yield data disclosing both range of the approaching vehicle from the transceiver and rate at which the vehicle is approaching the transceiver. The processor processes the data disclosing range of the approaching vehicle from the transceiver and rate at which the vehicle is approaching the transceiver in relation to the stored data, and activates a signaling device to signal the approaching vehicle when the data disclosing range of the approaching vehicle from the transceiver and rate at which the vehicle is approaching the transceiver correlates with stored data that identifies a potentially dangerous combination of range and rate.

11 Claims, 1 Drawing Sheet

STOP ALERT WARNING SYSTEM

FIELD OF THE INVENTION

This invention relates to a warning system for alerting the driver of a motor vehicle approaching a potentially hazardous site such as a traffic intersection to the potential hazard so that an inattentive, distracted, or drowsy driver will be alerted in ample time to safely brake the vehicle before entering the site.

BACKGROUND OF THE INVENTION

Various patents show various types of traffic warning systems for alerting the driver of a motor vehicle approaching a potentially hazardous location to the potential hazard. Most seem to require some sort of special equipment in the vehicle. One that does not appear to require such equipment is U.S. Pat. No. 5,892,461.

Traffic intersections in rural areas are examples of especially hazardous locations. Such intersections are often unmarked, and traffic approaching them is likely to be moving at high speeds. Even when marked, the marking may be nothing more than a sign or a flashing light. Blind intersections are especially hazardous.

Traffic accident reports chronicle numerous causes for traffic accidents. A frequently cause is driver distraction or inattention. An inattentive, distracted, or drowsy driver approaching a high-speed traffic intersection creates a potential hazard not only to himself or herself, but also to others and to property in the immediately vicinity.

SUMMARY OF THE INVENTION

The inventors believe that a traffic warning system that meets certain criteria could reduce the incidence of traffic accidents in certain hazardous locations.

Such a warning system should detect conditions of motor vehicle operation and distinguish motor vehicle operation that is relatively more potentially hazardous from motor vehicle operation that is relatively less potentially hazardous. It should promptly issue a warning in a manner that is highly probable of getting the attention of an inattentive, distracted, or drowsy driver of a motor vehicle approaching the potentially hazardous location. It should be entirely self-contained so as not to require any special equipment on motor vehicles. It should be suitable for installation in rural locations, even locations where electricity is not readily available. It should also be economical to manufacture, install, and operate with a minimum amount of periodic maintenance. It should be effective essentially independent of prevailing weather conditions.

The present invention provides a warning system that can meet these criteria.

Briefly, the invention comprises an on-site, self-contained, warning system that comprises a transceiver for illuminating the approach of a road vehicle to the site where the approaching may create or be exposed to a potential hazard, an example of such a site being a traffic intersection and immediate surroundings. One or more signaling devices at the site will give an alarm to the driver of the vehicle under certain conditions. The signaling devices will be activated when the possibility exists that the driver would not realize that he or she is driving too fast to assure a safe stop before entering the site.

A processor contains stored data correlating various combinations of range and speed that distinguish between combinations of potentially dangerous range and speed of the approaching vehicle and combinations that are not potentially dangerous. Vehicle range and speed data are obtained by radar. When the radar data discloses a combination of vehicle range and vehicle speed that coincides with a stored combination of potentially dangerous range and speed, it immediately activates the signaling devices.

To assure ample warning time to an inattentive, distracted or drowsy driver, the stored data provides a margin of safety intended to allow time to gain attention of the driver and to enable the driver to react in sufficient time to stop in a safe manner before entering the site.

DESCRIPTION OF THE INVENTION

Figure 1:
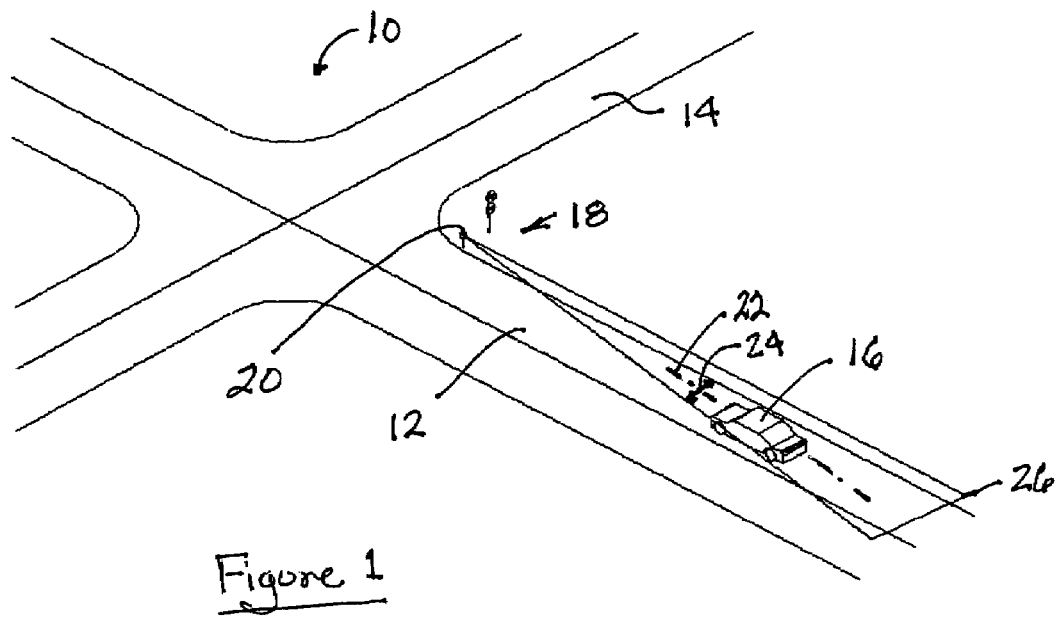
FIG. 1 is a perspective view of a traffic intersection having a warning system in accordance with principles of the invention.

FIG. 1 shows a traffic intersection 10 where roads 12 and 14 intersect. A motor vehicle 16 is shown traveling on road 12 approaching intersection 10. A warning system 18 in accordance with principles of the invention is shown at one corner of the intersection for warning the driver of vehicle 16 when the warning system detects that vehicle 16 is approaching the intersection in a potentially dangerous manner.

Warning system 18 comprises a transceiver 20 having a beam axis 22, a beam width 24, and a range 26 suitable for illuminating the approach of road 12 to intersection 10 such that an approaching vehicle like vehicle 16 will cause an alarm to be given to the driver of the vehicle under certain conditions.

Figure 2:
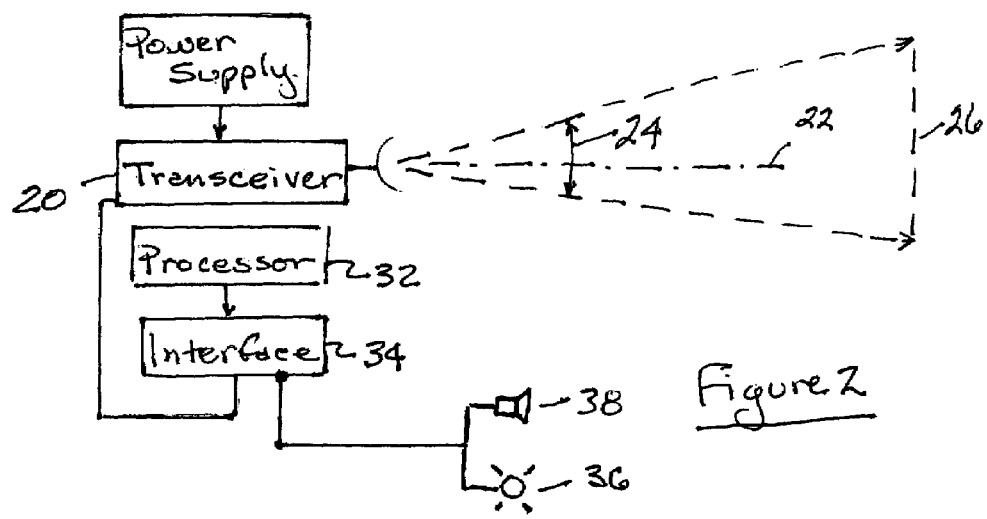
FIG. 2 is a schematic block diagram of the warning system.

Transceiver 20 preferably comprises a radar antenna that emits a radar beam through the atmosphere regardless of conditions of visibility, making the warning system essentially immune to conditions that could adversely affect visibility. FIG. 2 shows an exemplary configuration of equipment associated with transceiver 20.

That equipment includes an electric power supply that provides appropriate voltages and currents for transceiver 20 and other devices that include an electronic processor 32, an interface 34 between transceiver 20 and processor 22, and visible and audible signaling devices 36 and 38.

When an approaching vehicle is illuminated by a radar beam pulse, a portion of the emitted beam is reflected back to the radar antenna. Processor 32 calculates the time from the emission of the beam and until the return of the reflected beam to yield the range of vehicle from the intersection. Doppler shift imparted to the reflected beam by the approaching beam is calculated to yield vehicle speed.

Processor 32 contains stored data correlating various combinations of range and speed that distinguish between combinations of potentially dangerous range and speed and combinations that are not potentially dangerous. Vehicle range and speed data obtained by the radar are processed by the processor with respect to the various combinations of range and speed data stored in the processor. When the radar data discloses a combination of vehicle range and vehicle speed that coincides with a stored combination of potentially dangerous range and speed, it immediately activates signaling devices 36 and 38.

A potentially dangerous combination is one where the vehicle is considered to be approaching the intersection at a speed that for the particular distance of the vehicle from the intersection may be too fast to assure that the vehicle can be safely braked before entering the intersection. In other words, the signaling devices will be activated when the possibility exists that the driver would not realize that he or she is driving too fast to assure a safe stop before entering the intersection.

To assure ample warning time to an inattentive or distracted driver, the data stored in processor 32 has a margin of safety intended to allow time to gain attention of the driver and to enable the driver to react in sufficient time to stop in a safe manner before entering the intersection.

The signaling devices can include bright lights, flashing lights, strobe lights, and/or horns. The processor can also include the ability to log data for safety studies and communicate directly with appropriate authorities. If electric power from a utility is available on site, the warning system can be connected to it. If not, a solar collector and converter can be used to provide electric power.

Because weather conditions can affect braking distance, warning system 18 may be configured to have different sets of stored data correlated with different weather conditions that affect the road surface. For example, one set of stored data correlates various combinations of range and speed that distinguish between combinations of potentially dangerous range and speed and combinations that are not potentially dangerous for dry road surfaces. Another set of stored data correlates various combinations of range and speed that distinguish between combinations of potentially dangerous range and speed and combinations that are not potentially dangerous for wet road surfaces. Warning system may be connected to a sensor in the immediately vicinity to select the appropriate set of data for the prevailing road surface condition, or the appropriate set of data may be selected from a remote location.

While a presently preferred embodiment of the invention has been illustrated and described, it should be appreciated that principles of the invention apply to all embodiments falling within the scope of the following claims.

What is claimed is:

1. An on-site roadway warning system for alerting a driver of an approaching vehicle of a need to brake the vehicle, the warning system comprising:
    a transceiver for radiating electromagnetic energy toward the approaching vehicle and receiving reflected energy from the vehicle;
    a processor associated with the transceiver for processing data about the reflected energy in relation to data about the radiated energy to yield data disclosing both range of the approaching vehicle from the transceiver and rate at which the vehicle is approaching the transceiver;
    the processor containing stored data that correlates various combinations of range and speed that distinguish between combinations of potentially dangerous range and speed and combinations that are not potentially dangerous;
    the processor operating to process the data disclosing range of the approaching vehicle from the transceiver and rate at which the vehicle is approaching the transceiver in relation to the stored data; and
    a signaling device that is activated to signal the approaching vehicle when the processor determines that the data disclosing range of the approaching vehicle from the transceiver and rate at which the vehicle is approaching the transceiver correlates with stored data that identifies a potentially dangerous combination of range and rate.

2. An on-site roadway warning system as set forth in claim 1 wherein the signaling device comprises a visible signaling device that produces a visible signal for alerting the driver of the approaching vehicle.

3. An on-site roadway warning system as set forth in claim 1 wherein the signaling device comprises an audible signaling device that produces an audible signal for alerting the driver of the approaching vehicle.

4. A traffic roadway intersection comprising:
    intersecting roads;
    a self-contained warning system proximate the intersection for alerting a driver of an approaching vehicle of a need to brake the vehicle,
    the warning system comprising,
    i) a transceiver for radiating electromagnetic energy toward the approaching vehicle and receiving reflected energy from the vehicle,
    ii) a processor associated with the transceiver for processing data about the reflected energy in relation to data about the radiated energy to yield data disclosing both range of the approaching vehicle from the intersection and rate at which the vehicle is approaching the intersection,
    iii) the processor containing stored data that correlates various combinations of range and speed that distinguish between combinations of potentially dangerous range and speed and combinations that are not potentially dangerous,
    iv) the processor operating to process the data disclosing range of the approaching vehicle from the intersection and rate at which the vehicle is approaching the intersection in relation to the stored data, and
    v) a signaling device that is activated to signal the approaching vehicle when the processor determines that the data disclosing range of the approaching vehicle from the intersection and rate at which the vehicle is approaching the intersection correlates with stored data that identifies a potentially dangerous combination of range and rate.

5. A traffic roadway intersection as set forth in claim 4 wherein the signaling device comprises a visible signaling device that is proximate the intersection and produces a visible signal for alerting the driver of the approaching vehicle.

6. A traffic roadway intersection as set forth in claim 4 wherein the signaling device comprises an audible signaling device that is proximate the intersection and produces an audible signal for alerting the driver of the approaching vehicle.

7. A traffic roadway intersection as set forth in claim 4 wherein the stored data that correlates various combinations of range and speed that distinguish between combinations of potentially dangerous range and speed and combinations that are not potentially dangerous comprises one set for one road surface condition and a second set for a second road surface condition, and the particular one of the two sets that is processed is selected based on prevailing road surface condition.

8. A traffic roadway comprising:
    a road on which vehicles travel;
    a self-contained warning system proximate the road for alerting a driver of a vehicle approaching the warning system of a need to brake the vehicle,
    the warning system comprising, i) a transceiver for radiating electromagnetic energy toward the approaching vehicle and receiving reflected energy from the vehicle, ii) a processor associated with the transceiver for processing data about the reflected energy in relation to data about the radiated energy to yield data disclosing both range of the approaching vehicle from the warning system and rate at which the vehicle is approaching the warning system, iii) the processor containing stored data that correlates various combinations of range and speed that distinguish between combinations of potentially dangerous range and speed and combinations that are not potentially dangerous, iv) the processor operating to process the data disclosing range of the approaching vehicle from the warning system and rate at which the vehicle is approaching the warning system in relation to the stored data, and v) a signaling device that is activated to signal the approaching vehicle when the processor determines that the data disclosing range of the approaching vehicle from the warning system and rate at which the vehicle is approaching the warning system correlates with stored data that identifies a potentially dangerous combination of range and rate.

9. A traffic roadway as set forth in claim 8 wherein the signaling device comprises a visible signaling device that is proximate the road and produces a visible signal for alerting the driver of the approaching vehicle.

10. A traffic roadway as set forth in claim 8 wherein the signaling device comprises an audible signaling device that is proximate the road and produces an audible signal for alerting the driver of the approaching vehicle.

11. A traffic roadway as set forth in claim 8 wherein the stored data that correlates various combinations of range and speed that distinguish between combinations of potentially dangerous range and speed and combinations that are not potentially dangerous comprises one set for one road surface condition and a second set for a second road surface condition, and the particular one of the two sets that is processed is selected based on prevailing road surface condition.

* * * * *